US008799591B2

United States Patent
Larson et al.

(10) Patent No.: US 8,799,591 B2
(45) Date of Patent: Aug. 5, 2014

(54) READ-WRITE SPINLOCK

(75) Inventors: Douglas V. Larson, Santa Clara, CA (US); Marcia E. McConnell, Los Altos Hills, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2364 days.

(21) Appl. No.: 11/700,747

(22) Filed: Jan. 30, 2007

(65) Prior Publication Data

US 2008/0183979 A1    Jul. 31, 2008

(51) Int. Cl.
G06F 12/00    (2006.01)

(52) U.S. Cl.
USPC .................. 711/152; 711/150; 711/151

(58) Field of Classification Search
None
See application file for complete search history.

(56) References Cited

U.S. PATENT DOCUMENTS

| 6,546,465 | B1  | 4/2003  | Bertone |
| 6,601,120 | B1* | 7/2003  | Schimmel ............... 710/107 |
| 6,792,599 | B2  | 9/2004  | Poulsen et al. |
| 7,117,498 | B2  | 10/2006 | Li |

OTHER PUBLICATIONS

"Building an Embedded Control Program Workload" by H. Yu, et al. School of Computer Science, Univ. of Waterloo; Feb. 21, 2005. Retrieved from the Internet: http://www.cs.uwaterloo.ca/research/tr/2005/04/report.pdf. Total pp. 83.

* cited by examiner

*Primary Examiner* — Baboucarr Faal

(57) ABSTRACT

An embodiment of the invention provides an apparatus and method for controlling access by a read-write spinlock with no mutual exclusion among readers. The apparatus and method perform the steps of using values in a data structure in the read-write spinlock to control read access to a shared object and using values in the data structure and a guard lock to control write access to the shared object.

37 Claims, 2 Drawing Sheets

READ-WRITE SPINLOCK

TECHNICAL FIELD

Embodiments of the invention relate generally to a read-write spinlock with no mutual exclusion among readers.

BACKGROUND

In software engineering, a spinlock is a lock where a requester (e.g., a processor) waits in a loop ("spins") and the requester repeatedly checks if it can obtain the lock while waiting in the loop. After the requester obtains the spinlock, the requester will hold the spinlock until the requester releases the spinlock. The requester is required to hold the spinlock in order to access to a shared object such as, for example, a critical section in a memory, a shared data structure, a semaphore, or other suitable shared resources.

One type of spinlock is the read-write spinlock. A read-write spinlock permits multiple readers (i.e., requesters performing reading) to access the shared object at the same time, but the read-write spinlock only permits one writer (i.e., a requester performing writing) to access the shared object at any particular time, and the readers are not permitted to read to the shared object when a writer is writing to the shared object.

Previous read-write spinlocks use a guard lock or use two guard locks (or more in some implementations, e.g. one for each processor) to guard the access of readers and writers to a shared object. For a read-write spinlock that use one guard lock, a reader or writer first obtains the guard lock before a reader can obtain the read-write spinlock for reading (or before a writer can obtain the read-write spinlock for writing). For example, a reader that is trying to obtain the guard lock is required to wait if a writer is currently holding the guard lock. Additionally, before a reader (or writer) releases the read-write spinlock, the reader (or writer) is required to first obtain the guard lock and then alter the data structure of the read-write spinlock to indicate that the reader (or writer) has released the read-write spinlock. Therefore, the read-write spinlock with one guard lock requires a requester to perform two acquisitions and two releases of the guard lock.

For a read-write spinlock that use two guard locks ("guard1" and "guard2"), a reader that is trying to obtain the read-write spinlock will first acquire guard1, then increment a reader entry count, and then will release guard1. The reader then acquires the read-write spinlock and performs a read operation on the shared object. When the reader releases the read-write spinlock, the reader will first acquire guard2, then increments a reader exit count, and then will release guard2 prior to releasing the read-write spinlock. For a writer to obtain the read-write spinlock, the reader entry count has to be equal in value to the reader exit count. One example of an operating system that uses the read-write spinlock with two guard locks is the HP-UX operating system which is commercially available from HEWLETT-PACKARD COMPANY, Palo Alto, Calif.

All of these multiple guard lock acquisitions and release steps in the above-discussed previous methods are expensive in terms of CPU time in two ways: first, the sheer number of instructions that are executed (i.e., multiple spinlock and spinunlock calls), and second, on a machine with many processors, the time spent holding the guard locks can cause processor contention, which means the CPU just spins while waiting for the guard lock to become available. A third expense is that because the guard locks are shared objects, their use often incurs cache penalties, particularly under heavy use when many processors are accessing them. Additionally, the use of two guard locks makes the read-write spinlocks larger in data structure size.

Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
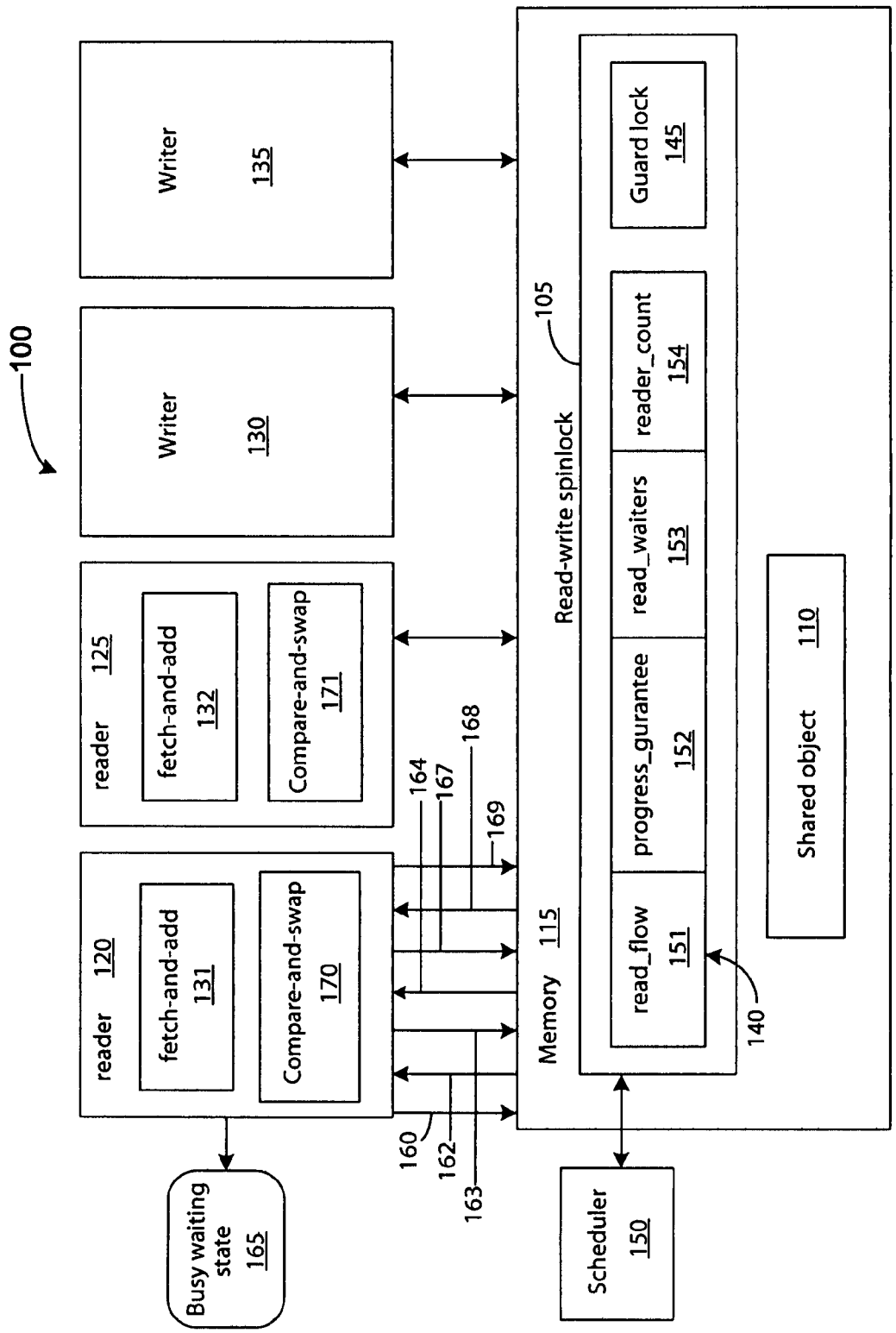
FIG. 1 is a block diagram of an apparatus (system) in accordance with an embodiment of the invention.

FIG. 1 is a block diagram of an apparatus (system) 100 in accordance with an embodiment of the invention. A read-write spinlock 105 is used to control the access of readers and writers to a shared object 110 in a memory 115. The shared object 110 can be, for example, a critical section in a memory, a shared data structure, a semaphore, or other suitable shared resources. In the example of FIG. 1, two readers (reader 120 and reader 125) and two writers (writer 130 and writer 135) are shown. However, the number of readers and writers may vary. A reader is a processor (e.g., CPU) that is performing a read operation on the shared object 110 and a writer is a processor that is performing a write operation on the shared object 110. Therefore, since the blocks 120, 125, 130, and 135 are processors, the readers 120 and 125 can subsequently perform write operations as writers, and the writers 130 and 135 can subsequently perform read operations as readers.

In an embodiment of the invention, the read-write spinlock 105 includes a data structure 140 and a guard lock 145, as described further below. The data structure 140 can be a suitable size such as, for example, approximately 8 bytes or 4 bytes. If the data structure 140 is 8 bytes in size, then the data structure 140 may have the following example data layout, although variations in the below data layout may also be implemented:

read_flow field 151 (read flow field 151) at Byte 0, progress_guarantee field 152 (progress guarantee field 152) at Byte 1, read_waiters field 153 (read waiters field 153) at Bytes 2-3, and reader_count field 154 (reader count field 154) at Bytes 4-7.

The use of the fields 151-154 are discussed in the examples below. Typically, the data structure 140 and guard lock 145 are within the shared object 110, but the data structure 140 and guard lock 145 have been illustrated in FIG. 1 as separated from the shared object 110 for purposes of clarity in the drawings.

The guard lock 145 is typically a standard mutual-exclusion spinlock. As known to those skilled in the art, a spinlock is a lock where a requester waits (spins) until the lock becomes available for the requester. The lock is typically a bit value that is set in a memory location of the shared object. Most modern spinlocks use a ticketing scheme where the requestor gets a ticket from the "next ticket" field in the lock and acquires ownership when the ticket is equal to the "now serving" field. This avoids both the expense of repeated atomic operations and many of the problems of arbitration.

A scheduler 150 can set the values in the fields 151-154 of the data structure 140 to initial values during initialization or re-start of the system 100. For example, the read_flow field 151 can be set to a value (e.g., logical "1") to permit read-locking. When the read_flow field 151 is set to permit read-locking, readers can obtain a read lock in order to permit the readers to perform a read access to the shared object 110. The values in the fields 152-154 can be set to an initial value of, for example, zero (0).

The scheduler 150 can be implemented by use of known programming languages such as, e.g., C or C++, and can be programmed by use of standard programming techniques.

In an embodiment of the invention, a reader or writer can use fetch-and-add instructions to operate on the data structure 140 and also obtain visibility of the values in the data structure 140. In the example of FIG. 1, the readers 120 and 125 can execute the fetch-and-add instructions 151 and 152, respectively. Note that the writers 130 and 135 execute the fetch-and-add instructions, respectively, when the writers become readers. As known to those skilled in the art, a fetch-and-add instruction is a CPU instruction that modifies the contents of a memory location and fetches the contents of memory location prior to modification. The steps in the fetch-and-add instruction are executed as an atomic hardware operation which means that no process can interrupt the steps in mid-execution. Therefore, the steps in the fetch-and-add instructions appear to the rest of the system 100 to be a single operation. As discussed in the examples below, these instructions allow a single reader to test if a read-lock lock is available, and to acquire the read-lock in a single atomic hardware operation if the read-lock is available.

As an example, assume that the reader 120 (i.e., a CPU attempting a read-lock acquisition) performs a fetch-and-add (+1) operation 160 to the data structure field 140 in order to obtain a read-lock that permits read access to the shared object 110. The data structure 140 serves as a read-lock 140 to permit one or more readers, and multiple readers can read on the shared object 110 in parallel and can therefore obtain a read-lock in parallel and read the shared object 110 at the same time. In contrast, previous methods have typically used a guard lock that is contended among readers in order to control the read access operations. A fetch-and-add operation is used to not only increment counts in the data structure 140, but also to simultaneously read the other fields in the data structure 140. As mentioned above, the data structure 140 may be, for example, an 8-byte quantity. The fetch-and-add (+1) operation 160 increments the reader_count 154 and simultaneously returns 162 the value of the read_flow field 151 to the reader 120. If the read_flow field 151 is set to a value (e.g., logical "1") that permits readers to perform a read on the critical region (shared object 110) and the reader_count 154 has been incremented by the fetch-and-add(+1) operation 160, then the reader 120 can proceed for a read access to the shared object 110. When the read_flow field 151 is set to a value (e.g., logical "1") to permit readers to read on the critical region, a writer is not currently accessing the shared object 110. In contrast, when the read_flow field 151 is set to a value (e.g., logical "0") that prevents readers to read, a writer is currently accessing the shared object 110. Therefore, a reader can read the shared object 110, after the reader increments the reader count 154 and finds the read_flow field 151 is set to a value (e.g., logical "1") to permit readers to read.

The data structure 140 advantageously permits and prevents access of readers to the shared object 110 based on the values in the fields 151-154. As a result, an embodiment of the invention does not require the use of a guard lock to control the access of readers to the shared object 110 and advantageously reduces the wasted CPU spin time of previous methods because the data structure 140 is not contended among readers. The use of the data structure 140 also reduces the larger lock data structures of previous methods. The atomic binding of reading the read_flow field with the incrementing of the reader count permits or prevents the readers to access the critical region. The readers do not access the guard lock 145.

If the read_flow field 151 is set to not permit readers for read access (e.g., field 151 is set to logical "0"), then a writer owns a write-lock that permits write access to the shared object 110. The guard lock 145 serves as a write-lock 145 as discussed in the example below. The reader 120 that is attempting to read then uses a fetch-and-add(+1) operation 163 to increment the read_waiters field 153 when the read_flow field 151 is set to not permit reading. Note that the value of the read_flow field 151 is simultaneously returned 164 to the reader 120 in this fetch-and-add operation 163. Note also that the reader_count 154 was previously incremented by the previous fetch-and-add(+1) operation 160. The reader 120 then spins and waits for the read_flow field 151 to be set to a value (e.g., logical "1") to permit reading. When the reader 120 is performing this spinning and waiting, the reader is in a busy waiting state (spin and wait state) 165.

When the read_flow field 151 changes to a value (e.g., logical "1") that permits reading, the reader 120 performs a fetch-and-add(−1) operation 167 on the data structure 140 so that the read_waiters field 153 is decremented, and the value of the read_flow field 151 is simultaneously returned 168 to the reader 120 in this fetch-and-add operations 167. If the read_flow field 151 is still set to permit readers (e.g., logical "1"), then the reader 120 can proceed for read access to the shared object 110. In contrast, if the read_flow field 151 is not set for reading (e.g., logical "0"), then the reader 120 is required to re-increment the read_waiters field 151 and spin in the busy waiting state 165. When the read_flow field 161 changes to a value (e.g., logical "1") that permits reading, the reader 120 again performs a fetch-and-add(−1) operation on the data structure field 140 so that the read_waiters field 153 is decremented, and the value of the read_flow field 151 is simultaneously returned to the reader 120 in this fetch-and-add operation. Next, if the read_flow field 151 is still set to permit readers (e.g., logical "1"), then the reader 120 can proceed for read access to the shared object 110.

To release the read-lock, the reader 120 performs fetch-and-add(−1) operation 169 on the data structure 140 so that the reader_count field 154 is decremented. Therefore, the reader_count field 154 indicates the current number of readers that have the read-lock or are attempting to obtain the read-lock.

Note also that starvation avoidance code may also be used in system 100 so that a reader is not perpetually denied in obtaining a read-lock. Various starvation avoidance methods are known to those skilled in the art.

The progress guarantee field 152 is actually a flag that, when set, indicates that one of the waiters if having trouble making forward progress and that the other waiters must stop trying for read access until that waiter makes progress. Therefore, the progress guarantee field is not a count.

Since a guard lock is not required for readers for read accesses to the shared object 110, multiple readers do not contend for a guard lock. As a result, an embodiment of the invention advantageously minimizes the wasted CPU time in prior methods because readers are not required to spin for an available guard lock.

The guard lock 145 serves as a write-lock 145 which permits only one writer to write to the shared object 110 at a time. The value in the read_flow field 151 is set by a writer when the writer obtains the guard lock 145. Therefore, the guard lock 145 protects write access to the read_flow field 151. For example, when the writer obtains the guard lock 145, the writer sets the read_flow 151 to a first value (e.g., logical "1") to indicate that reading to the shared object 110 is not currently permitted because the writer has the write-lock to the shared object 110. When the writer releases the guard lock 145, the writer sets the read_flow 151 to a second value (e.g., logical "0") to indicate that reading to the shared object 110 is now currently permitted because the writer has released the write-lock to the shared object 110.

As an example, a writer 130 (i.e., a processor attempting a write-lock acquisition) will first acquire the guard lock 145 which protects write access to the read_flow field 151. In an embodiment of the invention, only the writers will use the guard lock 145. The writer 130 then spins (in the busy waiting state 165) and waits for all readers in the busy waiting state 165 to go to zero (0) if there are current readers that are spinning (i.e., the writer 130 waits for all readers to finish spinning and obtain the read-lock; the writer 130 does not wait for the readers to finish until after setting the read_flow field. As an aside, note that this current phase is not necessary to obtain the lock, but is solely for the forward progress guarantee). The read_flow value must permit reading at this point, as it is unconditional. As discussed above, the number of readers in the busy waiting state 165 (when the read_flow value 151 permits reading on the shared object 110) is indicated in the read_waiters field 153. Because at this time the read_flow field 140 permits reading (e.g., is in the logical "1" value), this spinning of the readers is guaranteed to complete and these currently spinning readers will then obtain a read-lock, perform a read access of the shared object 110, and then release the read-lock.

Next, the writer sets the read_flow field 151 to a value that blocks new readers. When the read_flow field 151 is set to not permit reading, the readers will now have to spin and wait (in the busy waiting state 165) for a read-lock.

Next, the writer 130 waits for the read_waiters 153 to equal the reader_count 154. When the read_waiters 153 equals the reader_count 154, this indicates that there are no readers in the shared resource (protected resource). Since the writer 130 owns the guard lock 145 and no reader is performing a read access in the shared object 110, the writer 130 can now proceed with a write access to the shared object 110. Note that the guard lock 145 prevents two or more writers from owning the write-lock at the same time and therefore prevents two or more writers to perform a write access to the shared object 110 at the same time. Therefore, as an example, when the writer 130 has obtained the guard lock 145 and can perform a write access to the shared object 110, another writer 135 will not be able to perform a write access to the shared object 110.

The writer 130 releases the guard lock 145 in the following way: first the writer 130 sets the read_flow field 140 to again permit reading to the shared object 110 (to unblock readers), and then releases the guard lock 145. A writer obtains and releases the guard lock 145 by changing the values in the guard lock 145 (e.g., logical "1" if the guard lock 145 is held and logical "0" if the guard lock is not held).

In another embodiment of the invention, the readers execute compare-and-swap (CAS) instructions instead of fetch-and-add instructions in order to modify and read the values in the data structure 140. In the example of FIG. 1, the readers 120 and 125 can execute the CAS instructions 170 and 171, respectively. As known to those skilled in the art, CAS instructions are CPU instructions that compare the contents of a memory location to a given value and, if they are the same, the CPU modifies the contents of that memory location to a given new value. The result of the operation must indicate whether the CPU performed the substitution. This indication can be done either with a simple boolean response, or by returning the value read from the memory location (not the value written to the memory location). If the substitution fails to take place, the instruction sequence (includes a reset to the new value and the increment value to be compared and swapped) must iterate until the substitution does take place, or otherwise the count would be wrong.

An embodiment of the invention advantageously solves the problem of poor performance characteristics in lock acquisition and lock release of current read-write spinlocks. This problem causes the computer to spend more of its CPU cycles doing wasted work due to spinning when these lock acquisition and lock release code paths are heavily used. In contrast, an embodiment of the invention provides improved performance for a computer system because the lock acquisition/release code path is shorter for readers and there is no mutual exclusion of a guard lock among readers, and so there is no lock contention among readers. Also, the data structure in the read-write spinlock is more compact than current read-write spinlocks.

An additional advantage in an embodiment of the invention is a cache line advantage by use of the data structure 140. In contrast, previous read-write spinlocks that use two guard locks require the use of two different cache lines, and a cache line miss by a processor results in additional wasted processing cycles.

A further advantage in an embodiment of the invention is that all readers that are spinning can perform the read access to the shared object 110 in parallel when the read-lock becomes available. An additional advantage in an embodiment of the invention is in improved performance in systems that use a multi-threaded core.

Figure 2:
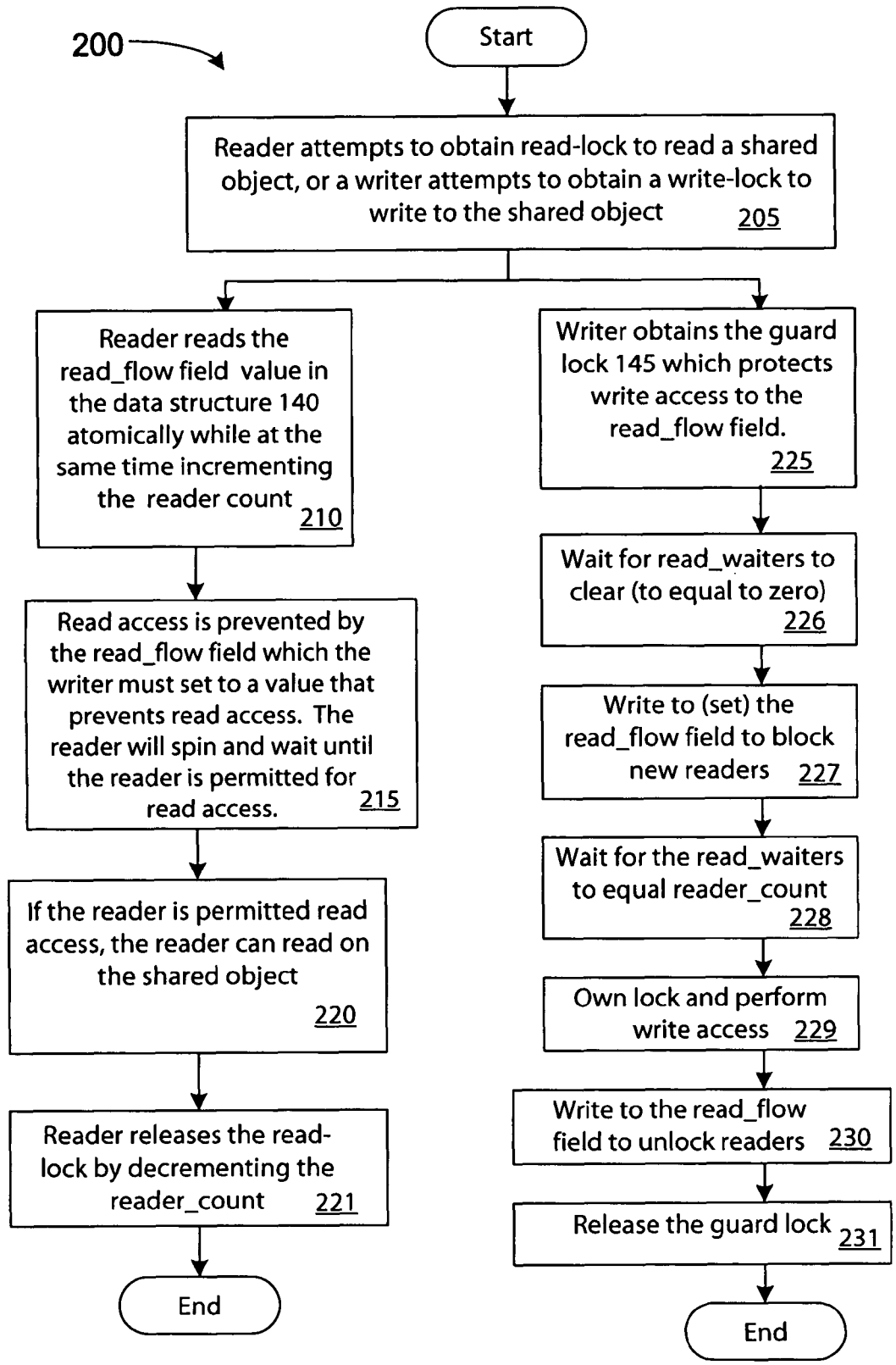
FIG. 2 is a flow diagram of a method in accordance with an embodiment of the invention.

FIG. 2 is a flow diagram of a method 200 in accordance with an embodiment of the invention.

In block 205, a reader attempts to obtain a read-lock to read a shared object 110, or a writer attempts to obtain a write-lock to write to the shared object.

In block 210, the reader reads the read_flow field value 151 in the data structure 140 atomically while at the same time incrementing the reader count 154.

In block 215, read access is prevented by the read_flow field which the writer must set to a value that prevents read access. The reader will spin and wait until the reader is permitted for read access. Note that even though the reader must spin, the reader count has been incremented. The reader count (reader_count) is the sum of all the reader spinners plus all the readers reading the shared data (of the shared object). That is why when the reader count is equal to the reader spinners, there is no reader in the shared data.

In block 220, if the reader is permitted read access, the reader can read on the shared object. The reader also releases the read-lock after performing the read access to the shared object.

In block 221, the reader releases the read-lock by decrementing the reader count.

The sequence for a writer is as follows.

In block 225, if a writer attempts to obtain a write-lock, the writer obtains the guard lock 145 (FIG. 1) which protects write access to the read_flow field.

In block 226, the writer then waits for the number of read_waiters 153 to clear (to go to or equal zero).

In block 227, the writer then writes to (i.e., sets) the read_flow field a value that blocks new readers, so that that new readers are prevented in performing read access to the shared object.

In block 228, the writer spins and waits for the read_waiters to equal reader_count. When these values are equal, there are no readers in the shared object (protected resource).

In block 229, the writer owns the write-lock and performs write access to the shared object.

In block 230, the writer writes to the read_flow field, so that the read_flow field is set to a value that unblocks readers and readers can perform read access to the shared object.

In block 231, the writer releases the guard lock. As a result, other writers will be able to write to the read_flow field.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising: using values in a data structure in a read-write spinlock but no guard lock to control read access to a shared object; and using values in the data structure and a guard lock to control write access to the shared object.

2. The method of claim 1, wherein the read-write spinlock permits multiple read accesses to the shared object at a same time.

3. The method of claim 1, wherein the guard lock prevents multiple write accesses to the shared object at a same time.

4. The method of claim 1, wherein a reader can start a read access if no writer has blocked read access by setting a read_flow field at a first value.

5. The method of claim 1, wherein a reader is prevented to start a read access if a writer sets a read_flow field to a second value that prevents read access and wherein the second value does not prevent a reader that is already reading to finish reading.

6. The method of claim 1, further comprising:
placing a reader in a spin and wait state if read access is not permitted to the shared object.

7. The method of claim 6, further comprising:
permitting a reader in the spin and wait state to obtain a read-lock and read to the shared object when read access is permitted to the shared object.

8. The method of claim 1, wherein write access is permitted after blocking new readers and there no readers executing in the shared object.

9. The method of claim 1, wherein write access is prevented if there are readers that are executing in the shared object.

10. The method of claim 1, further comprising:
placing a writer in a spin and wait state if write access is prevented.

11. The method of claim 1, wherein a reader reads and modifies the data structure by a fetch-and-add instruction.

12. The method of claim 11, wherein the fetch-and-add instruction increments counts and simultaneously reads the other fields in the data structure.

13. The method of claim 1, wherein a reader reads and modifies the data structure by a compare-and-swap instruction.

14. An apparatus comprising: non transitory media encoded with a read-write spinlock including a data structure; with values to control read access to a shared object without using a guard lock, and with values in the data structure and a guard lock to control write access to the shared object.

15. The apparatus of claim 14, wherein the read-write spinlock permits multiple read accesses to the shared object at a same time.

16. The apparatus of claim 14, wherein the guard lock prevents multiple write accesses to the shared object at a same time.

17. The apparatus of claim 14, wherein a reader can start a read access if no writer has blocked read access by setting a read_flow field at a first value.

18. The apparatus of claim 14, wherein a reader is prevented from starting a read access if a writer sets a read_flow field to a second value that prevents read access and wherein the second value does not prevent a reader that is already reading to finish reading.

19. The apparatus of claim 14, wherein a reader is placed in a spin and wait state if read access is not permitted to the shared object.

20. The apparatus of claim 19, wherein the reader in the spin and wait state is permitted to obtain a read-lock and to read to the shared object when read access is permitted to the shared object.

21. The apparatus of claim 14, wherein write access is permitted after blocking new readers and there no readers executing in the shared object.

22. The apparatus of claim 14, where write access is prevented if there are readers that are executing in the shared object.

23. The apparatus of claim 14, wherein a writer is placed in a spin and wait state if write access is prevented.

24. The apparatus of claim 14, wherein a reader reads and modifies the data structure by a fetch-and-add instruction.

25. The apparatus of claim 24, wherein the fetch-and-add instruction increments counts and simultaneously reads the other fields in the data structure.

26. The apparatus of claim 14, wherein a reader reads and modifies the data structure by a compare-and-swap instruction.

27. An apparatus for controlling access by a read-write spinlock with no mutual exclusion among readers, the apparatus comprising:
   means for using values in a data structure in the read-write spinlock to control read access to a shared object; and
   means for using values in the data structure and a guard lock to control write access to the shared object.

28. An article of manufacture comprising a non-transitory machine-readable storage medium having stored thereon instructions to:
   use values in a data structure in the read-write spinlock to control read access to a shared object without using a guard lock; and
   use values in the data structure and a guard lock to control write access to the shared object.

29. A method comprising:
   using a spinlock data structure to control read access and to control write access to a data object as a function of values stored in said data structure;
   using a guard lock to prevent a processor requesting write access to said data object other than a processor controlling said guard lock from writing to said spinlock data structure; and
   using atomic read-then-write instructions to prevent a processor requesting read access to said data object from writing to said spinlock structure while another processor is writing to said spinlock structure.

30. A method as recited in claim 29 wherein said read-then-write instructions include fetch-and-add instructions or compare-and-swap instructions.

31. A method as recited in claim 29 wherein said spinlock data structure includes a read-flow field for storing a read-flow value indicating whether or not read access is permitted to said data object, a read-waiters field for storing a read-waiters value indicating a number of processors waiting for read access to said data object, and a read-count field for storing a read-count value indicating a number of processors currently having read access to said data object.

32. A method as recited in claim 31 wherein a processor uses said read-then-write instructions to:
   increment said read-waiter value while waiting for read access to said data object;
   decrement said read-waiter value when provided read access to said data object while said read-waiter value is non-zero;
   increment said read-count value when provided read access to said data object; and
   decrement said read-count value upon completion of a read access of said data object.

33. A method as recited in claim 32 wherein said read-flow value indicates whether or not read access to said data object is enabled.

34. A method as recited in claim 33 wherein a processor requesting read access:
   i) determines from said read-flow value whether read access is enabled, and
   ii) if not, increments said read-waiter count and spins until said read access is provided.

35. A method as recited in claim 34 wherein, when said processor determines read access is currently provided to said data object, said processor:
   i) decrements said read-waiter value if it is non zero;
   ii) increments said read-count value;
   iii) reads from said data object; and
   iv) decrements said read-count value once said read access is complete.

36. A method as recited in claim 33 wherein a processor requesting write access to said data object:
   determines whether or not said guard lock is available; and
   if not, spins until said guard lock is available.

37. A method as recited in claim 36 wherein said processor:
   if said guard lock is available, acquires said guard lock so that it is unavailable to other processors requesting write access to said data object;
   if or once said read-waiter value is zero, sets said read-flow value to disable read access to said data object;
   if or once said read-count value is zero, exercises write access to said data object;
   once said write access is complete, resets said read-flow value to enable read access to said data object; and
   relinquishes said guard lock.

* * * * *

UNITED STATES PATENT AND TRADEMARK OFFICE
CERTIFICATE OF CORRECTION

PATENT NO. : 8,799,591 B2
APPLICATION NO. : 11/700747
DATED : August 5, 2014
INVENTOR(S) : Douglas V. Larson et al.

Page 1 of 1

It is certified that error appears in the above-identified patent and that said Letters Patent is hereby corrected as shown below:

In the Claims

In column 8, line 13, in Claim 8, delete "no" and insert -- are no --, therefor.

In column 8, line 52, in Claim 20, delete "and to" and insert -- and --, therefor.

In column 8, line 56, in Claim 21, delete "no" and insert -- are no --, therefor.

Signed and Sealed this
Eleventh Day of November, 2014

Michelle K. Lee
*Deputy Director of the United States Patent and Trademark Office*